United States Patent
Xiong et al.

(10) Patent No.: US 9,769,890 B1
(45) Date of Patent: Sep. 19, 2017

(54) CIRCUIT AND METHOD FOR ELIMINATING POWER-OFF FLASH FOR LED DRIVERS

(71) Applicant: Universal Lighting Technologies, Inc., Madison, AL (US)

(72) Inventors: Wei Xiong, Madison, AL (US); Candice Ungacta, Huntsville, AL (US); Danny Pugh, Harvest, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/227,674

(22) Filed: Aug. 3, 2016

Related U.S. Application Data

(60) Provisional application No. 62/203,200, filed on Aug. 10, 2015.

(51) Int. Cl.
| | |
|---|---|
| H05B 37/00 | (2006.01) |
| H05B 33/08 | (2006.01) |
| H02M 3/335 | (2006.01) |
| H02M 1/42 | (2007.01) |

(52) U.S. Cl.
CPC ...... *H05B 33/0815* (2013.01); *H02M 1/4241* (2013.01); *H02M 3/33507* (2013.01); *H05B 33/0845* (2013.01)

(58) Field of Classification Search
CPC ............ H05B 33/0815; H05B 33/0842; H05B 33/0845; H02M 1/42; H02M 1/4241; H02M 3/33507
USPC .... 315/200 R, 201, 246–247, 291, 294, 297, 315/307–308
See application file for complete search history.

(56) References Cited

U.S. PATENT DOCUMENTS

| | | | | |
|---|---|---|---|---|
| 5,770,925 A * | 6/1998 | Konopka | ........... | H05B 41/2985 315/127 |
| 6,057,652 A * | 5/2000 | Chen | ...................... | H05B 41/28 315/219 |
| 6,545,432 B2 * | 4/2003 | Konopka | ........... | H05B 41/2855 315/224 |
| 6,720,739 B2 * | 4/2004 | Konopka | ........... | H05B 41/2851 315/225 |
| 7,348,734 B2 * | 3/2008 | Yadlapalli | .......... | H05B 41/2851 315/224 |
| 8,742,674 B2 * | 6/2014 | Shteynberg | ........ | H05B 33/0815 315/201 |
| 8,937,438 B2 * | 1/2015 | Chen | ...................... | H02M 3/00 315/185 S |

(Continued)

*Primary Examiner* — Jason M Crawford
(74) *Attorney, Agent, or Firm* — Patterson Intellectual Property Law, P.C.; Mark J. Patterson; Jerry Turner Sewell

(57) ABSTRACT

An LED driver circuit and a method prevent LED turn-off flash when input power is lost to the driver circuit. The driver circuit includes a DC-DC converter that provides an LED drive voltage to an LED load. A voltage drop sensing circuit detects the loss of input power and discharges a filter capacitor that provides operating power to a controller in a DC-DC converter. The controller turns off to halt the operation of the DC-DC converter before the voltage provided to the LED load decreases to a turn-off threshold of the LED load. The DC-DC converter cannot recharge a load capacitor across the LED load. Thus, once the LEDs in the LED load turn off, the LEDs remain off until the input power is restored.

11 Claims, 5 Drawing Sheets

(56) References Cited

U.S. PATENT DOCUMENTS

| | | | |
|---|---|---|---|
| 8,941,304 B2* | 1/2015 | Goscha | H01J 61/56 |
| | | | 315/291 |
| 9,419,514 B1* | 8/2016 | Xiong | H02M 1/4208 |
| 2013/0162157 A1* | 6/2013 | Suzuki | H02M 7/217 |
| | | | 315/201 |
| 2014/0091720 A1* | 4/2014 | Brinlee | H05B 33/0815 |
| | | | 315/186 |

* cited by examiner

US 9,769,890 B1

CIRCUIT AND METHOD FOR ELIMINATING POWER-OFF FLASH FOR LED DRIVERS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: U.S. Provisional Patent App. No. 62/203,200 filed Aug. 10, 2015, entitled "Circuit and Method for Eliminating Power-Off Flash for LED Drivers."

BACKGROUND OF THE INVENTION

The present invention relates generally to electronic driver circuits for power light-emitting diodes (LEDs). An LED operates in response to a direct current flowing through the device from the anode to the cathode. Above a current threshold, the LED will begin emitting light at an intensity determined by the magnitude of the current. In a typical lighting application, a plurality of LEDs are connected in series so that a common current flows through the LEDs to cause each of the LEDs to illuminate with substantially the same intensities to provide a uniform lighting effect. The current through the LEDs is provided by an electronic LED driver circuit that provides an output voltage sufficient to cause the current to flow through the series connected LEDs. The LED driver circuit controls the current to a magnitude selected to provide the desired illumination intensity. The magnitude may be controlled by a dimmer circuit to allow the magnitude to be changed to thereby control the illumination intensity produced by the LEDs.

In a typical fixed (e.g., non-portable) application, an electronic LED driver circuit receives AC power from a conventional AC supply (e.g., by hard wiring an LED lighting fixture to the electrical wiring of a building or by plugging an LED lighting fixture into a conventional outlet). The LED driver circuit converts the AC power to DC power, and the DC power is connected to the LEDs.

An exemplary LED driver circuit 100 is illustrated in FIG. 1. The driver circuit receives AC power from an AC source 110. The AC power is coupled to the inputs 122, 124 of a full-wave bridge rectifier 120. The bridge rectifier includes a first bridge diode 130, a second bridge diode 132, a third bridge diode 134 and a fourth bridge diode 136. The four bridge diodes operate in a conventional manner to convert the AC input power to a DC output voltage. The DC output voltage is provided between a first (+) output 140 and a second (−) output 142 of the bridge rectifier. The voltage on the first (+) output of the bridge rectifier is identified as $V_{BRIDGE}$, and is provided on a $V_{BRIDGE}$ bus 144. The second (−) output of the bridge rectifier is connected to a common DC ground reference of the circuit 146.

The positive DC output voltage ($V_{BRIDGE}$) on the first (+) output 140 of the bridge rectifier 120 is connected to a first terminal of a bridge load resistor 150. A second terminal of bridge load resistor 150 is connected to the DC ground reference 146. The bridge load resistor 150 operates as a discharge resistor to discharge various capacitors in the circuit when AC power is no longer applied to the inputs 122, 124 of the full-wave bridge rectifier 120.

The positive DC output voltage ($V_{BRIDGE}$) is also connected to an input 162 of a power factor correction (PFC) circuit 160. The PFC circuit has an output terminal 164 that provides a DC voltage ($V_{RAIL}$) on a voltage bus 166. A voltage rail ($V_{RAIL}$) filter capacitor 168 is connected between the voltage bus and the ground reference. The $V_{RAIL}$ voltage bus is connected to the voltage input of a DC-DC converter stage 170. The DC-DC converter stage 170 provides an output voltage ($V_{LED}$) to an LED load 172. Although represented as a single load, the LED load may include a plurality of LEDs connected in series or connected in a series/parallel combination. The $V_{LED}$ output voltage causes current to flow through the LEDs to illuminate the LEDs in a conventional manner.

The DC-DC converter stage causes harmonics on the $V_{RAIL}$ voltage bus 166. If the DC-DC converter were connected directly to the output of the full-wave bridge rectifier 120, the harmonics would reduce the power factor of AC power coupled to the inputs 122, 124 of the full-wave bridge rectifier. The PFC circuit 160 isolates the $V_{RAIL}$ voltage bus from the $V_{BRIDGE}$ voltage bus. The PFC circuit operates in a conventional manner to cause the overall load between the first and second outputs of the bridge rectifier to have a greater effective power factor (e.g., a power factor closer to an ideal power factor of 1). The PFC circuit may comprise passive components or active devices. For example, in one embodiment, the PFC circuit may be a conventional power factor control circuit based on the STMicroelectronics L6562 Transition-Mode PFC Controller.

As shown in FIG. 1, the DC-DC converter stage 170 includes an integrated circuit controller (IC CTRL) 180. In the illustrated embodiment, the controller may be an L6384 High Voltage Half-Bridge Driver, which is commercially available from STMicroelectronics. The controller drives a first semiconductor switching element (e.g., a MOSFET) 182 and a second switching element (e.g., a MOSFET 184, which are connected in series between the $V_{RAIL}$ voltage bus 166 and the circuit ground reference 146. The first and second switching elements are connected at a common node 186. The controller has an input (IN) that receives a periodic signal (f) from a signal source 188, which may be a fixed frequency signal source or a variable frequency signal source. The controller drives the two switching elements in response to the periodic signal. When the first switching element is turned on, the common node is pulled up to the voltage $V_{RAIL}$. When the second switching element is turned on, the common node is pulled down to ground. The two switching elements are operated in a conventional manner at a selected frequency and with selected duty cycles to produce a switched DC voltage at the common node that alternates between $V_{RAIL}$ and ground.

The common node 186 between the two switching elements 182, 184 is connected to a first input 192 of a power tank circuit 190. A second input 194 of the power tank is connected to the ground reference 146. The power tank circuit has an input portion 196 and an output portion 198. The combination of the power tank circuit, the controller 180 and the switching elements 184, 186 operate as a resonant DC-DC converter to convert the $V_{RAIL}$ voltage on the bus 166 to the $V_{LED}$ voltage applied to the LED load 172.

The input portion 196 of the power tank circuit 190 includes a resonant inductor 200 and a resonant capacitor 202, which are connected in series between the common node 186 and the ground reference 146. The inductance of the resonant inductor and the capacitance of the resonant capacitor are selected to resonate at the switching frequency of the controller 180 such that the switched DC voltage on the common node 180 causes an AC voltage with a DC offset component to be produced across the resonant circuit capacitor. The switching frequency of the controller is variable to adjust the magnitude of the AC voltage across the resonant circuit capacitor. For example, when the switching frequency is reduced below the resonant frequency or increased above the resonant frequency, the voltage across the capacitor decreases. Accordingly, by adjusting the switching frequency, the voltage can be selectively reduced to reduce the current through the LED load 172 and thereby cause the light produced by the LED load to be dimmed.

A DC blocking capacitor 210 and the primary winding 214 of a transformer 212 are connected in series across the resonant circuit capacitor 202 to cause only the AC component of the voltage across the resonant circuit capacitor to be coupled to the primary winding. The DC blocking capacitor 210 prevents DC current from passing through the primary winding.

In the output portion 198 of the power tank circuit 190, the transformer 212 has a center-tapped secondary winding 216. The secondary winding has a first winding half 218 and a second winding half 220. The first winding half is connected between a common node 222 and a first output terminal 224. The second winding half is connected between the common node and a second output terminal 226. The first output terminal is connected to the anode of a first rectifying diode 232 in a full-wave rectifier 230. The second output terminal is connected to the anode of a second rectifying diode 234 in the full-wave rectifier. The cathodes of the two rectifying diodes are connected together at a rectifier output node 236. The rectifier output node is coupled to a first (+) output 240 of the power tank circuit 190. The common node of the secondary winding is connected to a second (−) output 242 of the power tank circuit.

The voltage produced between the first (+) output 240 and the second (−) output 242 of the power tank circuit 190 is applied across a load capacitor 250 and across the LED load 172. The voltage is identified as $V_{LED}$. The load capacitor filters out the high frequency ripple of the $V_{LED}$ voltage. Although shown outside the power tank circuit, the load capacitor may also be considered to be part of the power tank circuit.

A charge pump circuit 260 is connected to the common node 186 between the two switching elements 182, 184. The charge pump circuit includes a charge pump input capacitor 262 having a first terminal connected to the common node. The second terminal of the charge pump input capacitor is connected to the anode of a first charge pump diode 264 and to the cathode of a second charge pump diode 266. The anode of the second charge pump diode is connected to the DC ground reference 146. The cathode of the first charge pump diode is connected to a first terminal of a $V_{CC}$ filter capacitor 270 and to the power input ($V_{CC}$) of the integrated circuit controller 180 at a node 272 identified as $V_{CC}$. A second terminal of the $V_{CC}$ filter capacitor is connected to the DC ground reference 146. The second charge pump diode is a Zener diode having a voltage rating selected to clamp the voltage applied to the $V_{CC}$ node via the first charge pump diode during the positive going (+dv/dt) half of each switching cycle at the common node. The second charge pump diode also provides a discharge path for the charge pump input capacitor during the negative going (−dv/dt) half of each switching cycle at the common node.

The $V_{CC}$ node 272 is also connected to a first terminal of a power input resistor 280. A second terminal of the power input resistor is connected to the $V_{BRIDGE}$ bus 144. As described below, the power input resistor 280 operates as a passive voltage supply circuit that receives power from the $V_{BRIDGE}$ bus and that provides a first charging voltage via one or more passive components.

The power input resistor 280 and the charge pump circuit 260 both supply power to the $V_{CC}$ node 272 and thus to the $V_{CC}$ power input of the controller 180. Upon initial startup, the $V_{CC}$ filter capacitor 270 is charged from the $V_{BRIDGE}$ bus 144 through the power input resistor. Thus, the power input resistor (the passive voltage source) operates as a first charging voltage source to the $V_{CC}$ filter capacitor. The resistance of the power input resistor is selected to charge the capacitor at a relatively slow rate. For example, in one embodiment, the resistor has a resistance of approximately 150 ohms, and the $V_{CC}$ filter capacitor has a capacitance of approximately 2.2 microfarads.

The $V_{CC}$ filter capacitor 270 continues to charge through the power input resistor 280 until the voltage on the $V_{CC}$ node 272 reaches a threshold voltage sufficient to initiate the operation of the controller 180. When the threshold voltage is reached, the controller begins to operate in a conventional manner as described above to switch the two switching elements 182, 184 to generate the switched DC voltage on the common node 186. The switched DC voltage is coupled through the charge pump capacitor 262 and the first charge pump diode 264 to provide a second charging voltage source to charge the $V_{CC}$ filter capacitor. Together, the two switching elements and the charge pump 260 operate as an active voltage source to charge the VCC filter capacitor when the DC-DC converter 170 is operating. The power provided to the $V_{CC}$ filter capacitor via the charge pump is not dissipated by a dropping resistor or other resistive element. Thus, during normal operation, the voltage on the $V_{CC}$ node to maintain the charge on the $V_{CC}$ filter capacitor is provided primarily by current provided by the charge pump.

The above-described LED drive circuit 100 provides current to the LED load 172 as long as the AC source 110 continues to provide input power. When the input power is lost (e.g., the AC source turns off or is disconnected), the voltage on the $V_{RAIL}$ bus 166 is maintained by the $V_{RAIL}$ capacitor 168 as the $V_{RAIL}$ filter capacitor starts to discharge slowly. The $V_{RAIL}$ filter capacitor discharges at a rate determined by the capacitance of the $V_{RAIL}$ filter capacitor and the current provided to the LED load via the DC-DC converter 170. A greater load (e.g., more current flowing through the LED load) causes the $V_{RAIL}$ filter capacitor to discharge faster; and a lower load causes the $V_{RAIL}$ filter capacitor discharged slower. Thus, when the LED load is operating in a dimmed condition with a lower current flowing through the LED load, the $V_{RAIL}$ filter capacitor discharges slowly such that the controller 180 continues to operate for a substantial time (e.g., up to at least a few hundred milliseconds).

The foregoing effect is illustrated in FIG. 2. In the uppermost waveform of FIG. 2, the voltage $V_{RAIL}$ is shown as being substantially constant from a time $t_0$ until a time $t_1$. At the time $t_1$, the AC input power is lost (e.g., by turning off a wall switch or the like). Although the AC source 110 is no longer providing a voltage to the input of the PFC 160 via the full-wave bridge rectifier 120, the voltage $V_{RAIL}$ does not decrease immediately. Rather, the voltage decreases slowly as the $V_{RAIL}$ filter capacitor 168 discharges through the LED load 172. Although the discharge is illustrated as a straight line, it should be understood that the discharge may be nonlinear (e.g., exponential). For simplification, nonlinear voltage and current values are represented herein as straight line segments.

During the initial discharge of the $V_{RAIL}$ filter capacitor 168, the controller 180 and the switching elements 182, 184 continue to operate to provide an AC voltage at the common node 186. The charge pump 260 continues to operate to provide $V_{CC}$ to the power input of the controller. The power tank 190 continues to provide the voltage $V_{LED}$ on the rectifier output node 236 connected to the LED load 172; however, as shown in the middle waveform in FIG. 2, the voltage $V_{LED}$ also decreases in response to the decreasing voltage $V_{RAIL}$. The decreasing voltage $V_{LED}$ causes the current flowing through the LED load to decrease as represented by a current $I_{LED}$ shown in the lowermost waveform in FIG. 2. The decreasing current causes the light produced by the LED load to gradually dim.

As further shown in FIG. 2, the voltage $V_{RAIL}$ continues to decrease as the $V_{RAIL}$ filter capacitor 166 continues to discharge. The voltage $V_{LED}$ also continues to decrease in response to the decreasing voltage $V_{RAIL}$; however, at a time $t_2$, the voltage $V_{LED}$ decreases below a threshold voltage $V_{LEDTH}$ and is no longer sufficient to maintain current flow through the series-connected LEDs in the LED load 172. Thus, the LEDs in the LED load turn off at the time $t_2$, and current no longer flows through the LEDs as illustrated the current $I_{LED}$ decreasing to zero at the time $t_2$.

Although the foregoing operation would not be an issue if the LEDs in the LED load 172 remained off, the controller 180 continues to switch the switching elements 182, 184 and thus continues to maintain an AC voltage on the common node 186 at the input to the power tank circuit 190. The power tank circuit continues to provide the DC voltage $V_{LED}$ to the load capacitor 240 across the LED load. Because the LEDs in the LED load are no longer conducting and thus present no load to the power tank circuit, the voltage across the load capacitor starts to increase rapidly. This rapid increase is represented as a sharp voltage spike 290 between the time $t_2$ and a time $t_3$. The voltage spike has a magnitude substantially greater than the threshold voltage $V_{LEDTH}$ of the series-connected LEDs in the LED load. Thus, a large current—represented by a spike 292 in the current waveform LED in FIG. 2—flows through the LED load and causes a visible flash of light from the LEDs in the LED load. The sudden flash of light after the LEDs have apparently turned off is annoying to occupants of an area illuminated by the LEDs and may suggest to the occupants that the LED fixture has failed.

SUMMARY OF THE INVENTION

The invention disclosed herein provides a solution to the above-described problem of the post-turn-off flash of the LEDs. One aspect of the solution is a method that turns off the controller in the DC-DC converter to discontinue switching the switching elements shortly after the AC source is disconnected. Turning off the controller terminates the operation of the power tank circuit immediately to thereby terminate the generation of the voltage $V_{LED}$ applied to the LED load. Accordingly, the power tank circuit no longer charges the load capacitor across the LED load after the LEDs in the LED load are turned off. This precludes the generation of the voltage spike and the resulting current spike that cause the LED flash.

Another aspect of the invention is an LED driver circuit and a method that prevent LED turn-off flash when input power is lost to the driver circuit. The driver circuit includes a DC-DC converter that provides an LED drive voltage to an LED load. A voltage drop sensing circuit detects the loss of input power and discharges a filter capacitor that provides operating power to a controller in a DC-DC converter. The controller turns off to halt the operation of the DC-DC converter before the voltage provided to the LED load decreases to a turn-off threshold of the LED load. The DC-DC converter cannot recharge a load capacitor across the LED load. Thus, once the LEDs in the LED load turn off, the LEDs remain off until the input power is restored.

In accordance with an aspect of the embodiment disclosed herein, a drive circuit provides a DC voltage to a plurality of light-emitting diodes (LEDs). The drive circuit includes a rectifier that converts an applied AC voltage to a rectified DC voltage. A passive voltage circuit receives the rectified DC voltage and produces a first charging voltage. A power factor correction circuit receives the rectified DC voltage and generates a rail DC voltage. A switching DC-DC converter receives the rail DC voltage and converts the rail DC voltage to an LED drive voltage and to a second charging voltage. The DC-DC converter includes a controller, at least first and second semiconductor switches, and a resonant tank circuit. The semiconductor switches are selectively switched by the controller to produce a switched DC voltage. The resonant tank circuit is responsive to the switched DC voltage to produce the LED drive voltage. The controller has a power input terminal. The controller is operable to switch the semiconductor switches only when a voltage on the power input terminal is at least as great as a controller threshold voltage. A filter capacitor is coupled to provide a controller supply voltage to the power input terminal of the controller. The filter capacitor receives the first charging voltage when the applied AC voltage is initially applied to the rectifier. The first charging voltage charges the capacitor to the controller threshold voltage. The capacitor receives the second charging voltage when the controller is operable after the capacitor charges to the controller threshold voltage. A voltage drop sensing circuit is coupled to receive the first charging voltage. The voltage drop sensing circuit senses when the first charging voltage decreases upon loss of the applied AC voltage. The voltage drop sensing circuit responsive to the decreasing first charging voltage to discharge the filter capacitor below the controller threshold voltage to halt the operation of the controller and thereby cease producing the LED drive voltage.

In certain embodiments, the passive voltage circuit may be a power input resistor.

In certain embodiments, the power input resistor in the passive voltage circuit includes a first terminal and a second terminal. The first terminal is connected to the rectifier. The second terminal is coupled to the filter capacitor and coupled to the voltage drop sensing circuit.

In certain embodiments, the power input resistor in the passive voltage circuit includes a first terminal and a second terminal. The first terminal is connected to the rectifier. The second terminal is connected to the voltage drop sensing circuit. The passive voltage circuit further includes a Zener diode and a forward-biased diode connected in series between the second terminal of the power input resistor and the filter capacitor.

In certain embodiments, the power input resistor in the passive voltage circuit includes a first terminal and a second terminal. The first terminal is connected to the rectifier. The second terminal further connected to the voltage drop sensing circuit. The passive voltage circuit further includes a forward-biased diode and resistor connected in series between the second terminal of the power input resistor and the filter capacitor.

In certain embodiments, the voltage drop sensing circuit comprises a discharge resistor and a discharge transistor. The discharge resistor and the discharge transistor are connected in series across the filter capacitor. The discharge transistor is responsive to the decreasing first charging voltage to turn on the discharge transistor and to discharge the filter capacitor via the discharge resistor.

In certain embodiments, the voltage drop sensing circuit further includes a voltage sensing capacitor connected to the control terminal of the discharge transistor. The voltage sensing capacitor has a capacitance less than the capacitance of the filter capacitor. The voltage sensing capacitor discharges faster than the filter capacitor upon loss of the applied AC voltage to turn on the discharge transistor and increase the discharge rate of the filter capacitor.

In certain embodiments, a capacitor is coupled to the output of the power factor correction circuit. The capacitor maintains the DC rail voltage on the output of the power factor correction circuit at a slowly decreasing level for a selected time after the loss of the applied AC voltage to enable the DC-DC converter to continue generating the LED drive voltage. The LED drive voltage decreases in response to the decreasing level of the DC rail voltage. The voltage drop sensing circuit is operable to halt the operation of the controller before the LED drive voltage decreases to a threshold voltage for operating the plurality of LEDs.

In accordance with another aspect of the embodiment disclosed herein, a drive circuit provides a DC voltage to a plurality of light-emitting diodes (LEDs) in response to an applied input voltage. The drive circuit includes a first charging voltage circuit responsive to the applied input voltage to generate a first charging voltage. A rail voltage circuit is responsive to the applied input voltage to generate a rail voltage. A switching DC-DC converter is responsive to the rail DC voltage to generate an LED drive voltage and a second charging voltage. The DC-DC converter includes a controller having a power input terminal. The DC-DC converter is operable only when a voltage on the power input terminal of the controller is at least as great as a controller threshold voltage. A filter capacitor is coupled to provide a controller supply voltage to the power input terminal of the controller. The filter capacitor receives the first charging voltage when the applied input voltage is active. The first charging voltage charges the filter capacitor to the controller threshold voltage. The filter capacitor receives the second charging voltage when the controller is operable after the filter capacitor charges to the controller threshold voltage. A voltage drop sensing circuit is coupled to receive the first charging voltage. The voltage drop sensing circuit senses when the first charging voltage decreases upon loss of the applied input voltage. The voltage drop sensing circuit is responsive to the decreasing first charging voltage to discharge the filter capacitor below the controller threshold voltage to halt the operation of the controller and thereby cease producing the LED drive voltage.

In certain embodiments, a capacitor is connected to the rail voltage circuit. The capacitor maintains the DC rail voltage at a slowly decreasing level for a selected time after the loss of the applied input voltage to enable the DC-DC converter to continue generating the LED drive voltage. The LED drive voltage decreases in response to the decreasing level of the DC rail voltage. The voltage drop sensing circuit is operable to halt the operation of the DC-DC converter before the LED drive voltage decreases to a threshold voltage for operating the plurality of LEDs.

In accordance with another aspect of the embodiment disclosed herein, a method prevents power-off flash in a light-emitting diode (LED) drive circuit. The method includes generating a switched DC voltage from an applied input voltage with a switching DC-DC converter. The switching DC-DC converter is controlled by a switching controller having a power input terminal. The method further includes generating an LED drive voltage from the switched DC voltage; and generating a first capacitor charging voltage responsive to the applied input voltage. The method further includes generating a second capacitor charging voltage responsive to the switched DC voltage. The method further includes applying the first capacitor charging voltage and the second capacitor charging voltage to a controller power input capacitor to charge the controller power input capacitor and provide a DC supply voltage to the switching controller. The method further includes sensing a loss of the applied input voltage and discharging the controller input capacitor to disable the switching controller before the LED drive voltage decreases to a voltage level below an operational threshold voltage of the plurality of LEDs.

DETAILED DESCRIPTION OF THE INVENTION

Figure 1:
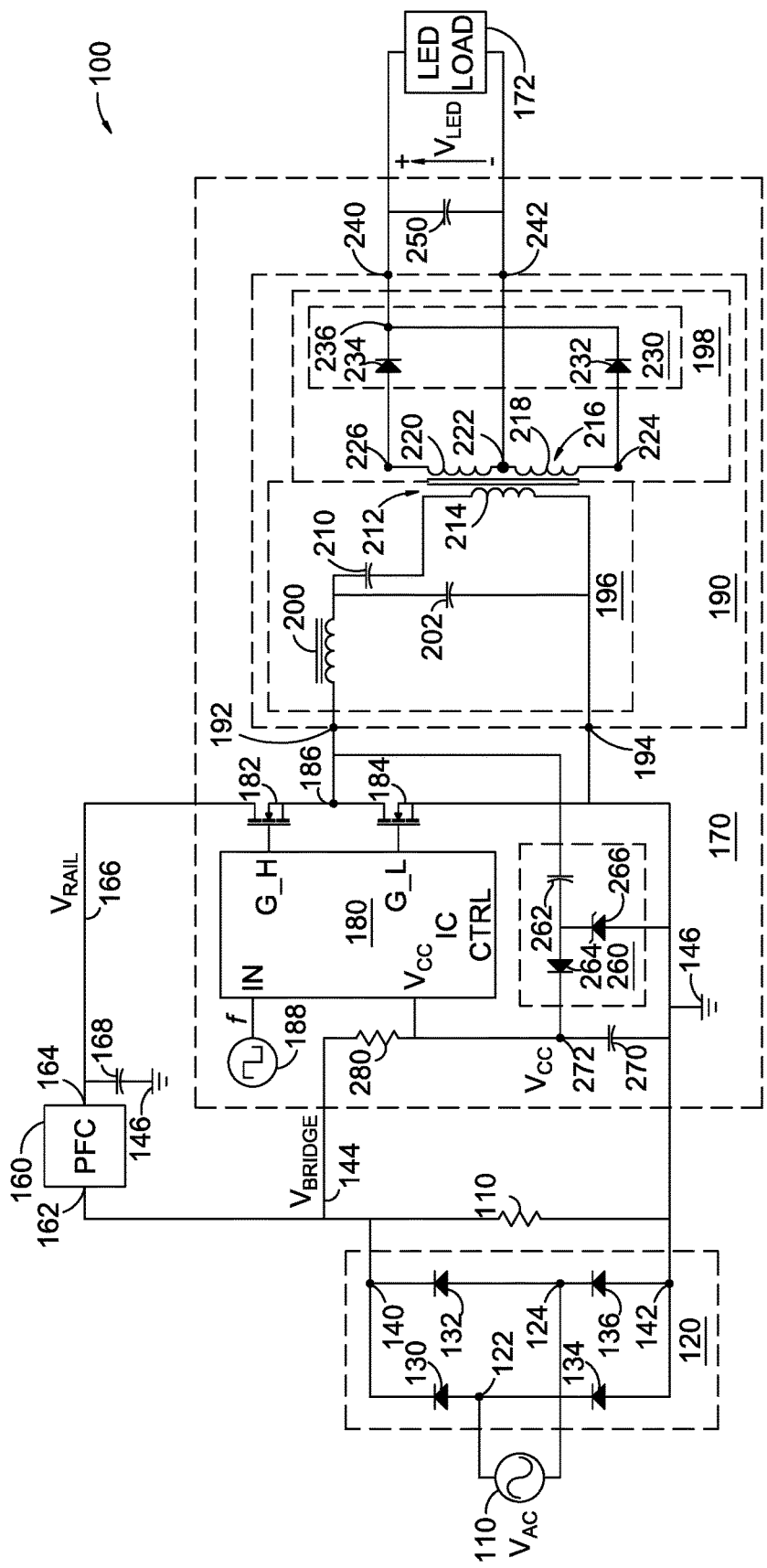
FIG. 1 is a circuit diagram showing an electronic LED drive circuit as conventionally known in the art.
Figure 2:
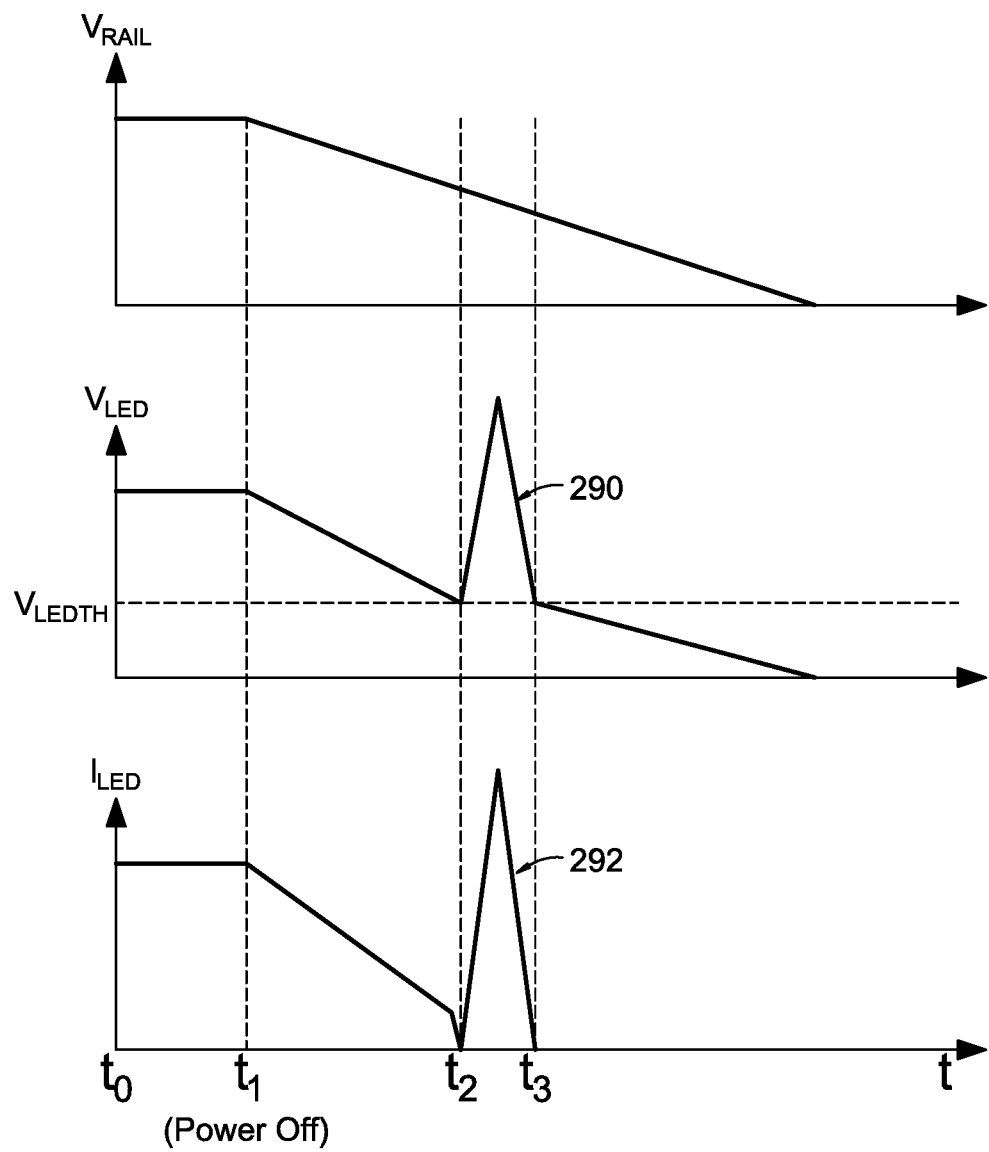
FIG. 2 illustrates waveforms of a rail voltage $V_{RAIL}$ of FIG. 1, the voltage $V_{LED}$ across the LED load connected to the LED drive circuit of FIG. 1, and the current $I_{LED}$ through the LED load connected to the LED drive circuit of FIG. 1.
Figure 3:
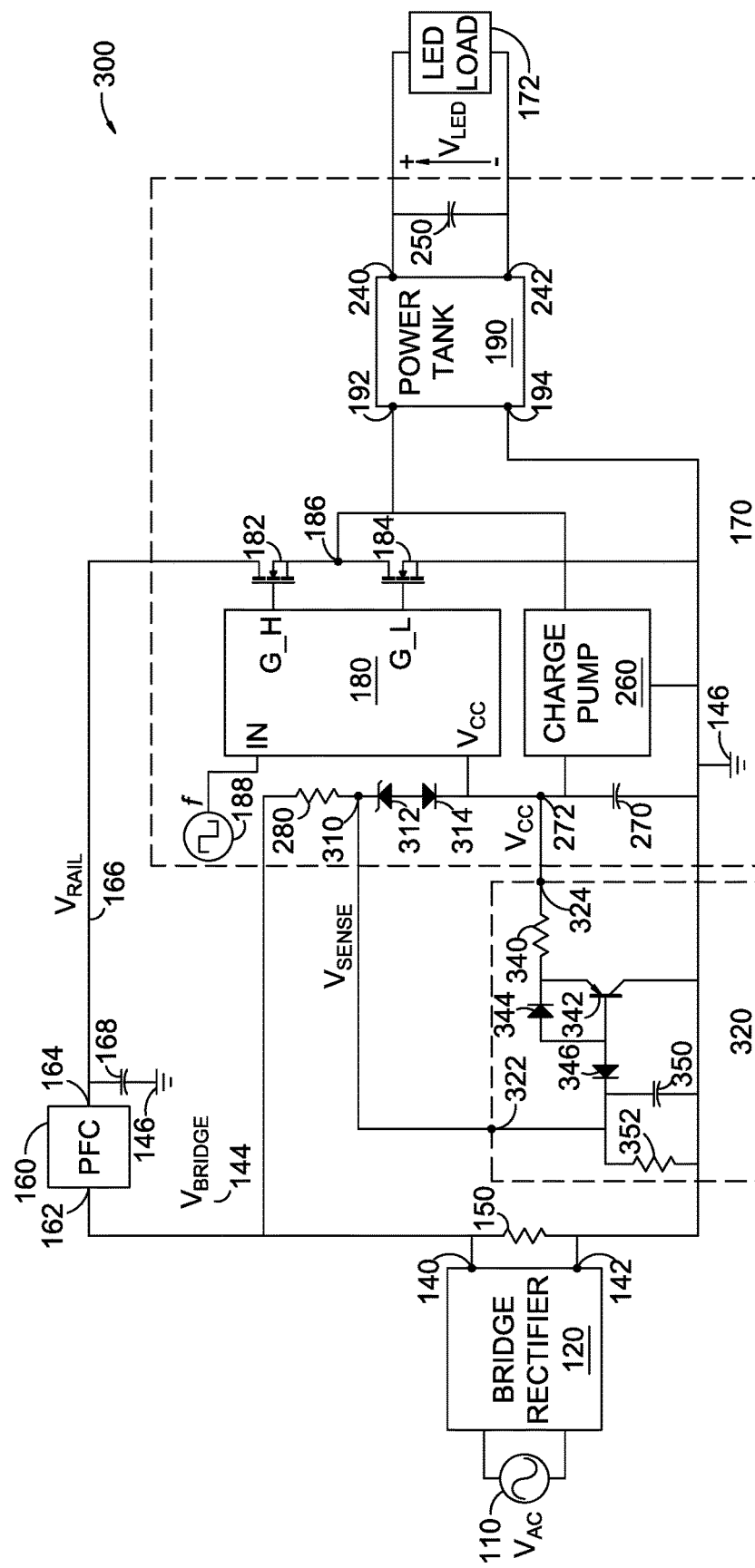
FIG. 3 illustrates a circuit diagram showing an LED drive circuit with a voltage drop sensing circuit that prevents power-off flash of the LEDs driven by the drive circuit.

An exemplary solution to the problem disclosed in FIGS. 1 and 2 is illustrated by the improved LED driver circuit 300 in FIG. 3. In FIG. 3, elements corresponding to elements in FIG. 1 are identified with corresponding element numbers and are not described in detail below. The power tank circuit 190 and the charge pump circuit 260 are represented as blocks. The components within the two circuits are illustrated in FIG. 1 and are described above.

Unlike the driver circuit 100 in FIG. 1, the driver circuit 300 in FIG. 3 does not connect the power input resistor 280 directly to the $V_{CC}$ node 272 and the power input terminal of the controller 180. Instead, the power input resistor is connected to a voltage sensing node 310, which has a sense voltage ($V_{SENSE}$) thereon.

The voltage sensing node 310 is also connected to the cathode of a Zener diode 312. In the illustrated embodiment, the Zener diode has a Zener voltage of approximately 10 volts. The anode of the Zener diode is connected to the anode of an isolation diode 314. The cathode of the isolation diode is connected to the $V_{CC}$ node 272. Thus, the passive voltage source in FIG. 3 includes three passive components: the power input resistor; the Zener diode; and the isolation diode. The $V_{CC}$ node is connected to the power input terminal ($V_{CC}$) of the controller. The $V_{CC}$ node is also connected to the first terminal of the $V_{CC}$ filter capacitor 270 and to the output of the charge pump 260 as described above in connection with FIG. 1.

Unlike the previously described driver circuit 100, the LED driver circuit 300 in FIG. 3 further includes a voltage drop sensing circuit 320. The voltage drop sensing circuit has an input terminal 322 connected to the voltage sensing ($V_{SENSE}$) node 310 and has an output terminal connected to the $V_{CC}$ node 272. The structure and the operation of the voltage drop sensing circuit are described in more detail below.

During power up and during normal operation, the LED driver circuit 300 in FIG. 3 operates in a similar manner to the LED driver circuit 100 in FIG. 1. When power from the AC source 110 is initially applied to the driver circuit in FIG. 3, the voltage $V_{BRIDGE}$ on the $V_{BRIDGE}$ bus 144 is applied to the $V_{CC}$ node 272 via the power input resistor 280, the Zener diode 312 and the isolation diode 314. The Zener diode and the isolation diode cause the voltage at the $V_{CC}$ node provided from the $V_{SENSE}$ node 310 to be approximately 10.7 volts below the voltage $V_{BRIDGE}$. The initial voltage on the $V_{CC}$ node is sufficient to charge the $V_{CC}$ filter capacitor 270 to a sufficient voltage level to cause the controller 180 to begin operating. Thus, the two switching elements 182, 184 begin switching to supply the AC voltage to the power tank circuit 190 and to the charge pump circuit 260 as described above. The charge pump provides current to further charge the $V_{CC}$ filter capacitor. When the $V_{CC}$ filter capacitor is fully charged, the voltage provided by the charge pump circuit is greater than the voltage provided by the power input resistor via the Zener diode and the isolation diode. Thus, the isolation diode is reverse-biased when the controller is operating. While the AC source is connected, the LED driver circuit of FIG. 3 operates to provide power to the LED load via the power tank circuit 190 as described above.

The voltage drop sensing circuit 320 operates to prevent the LED flash problem described above. The voltage drop sensing circuit includes a discharge resistor 340, which has a first terminal connected to the $V_{CC}$ node 272 via the output terminal 324. The discharge resistor has second terminal connected to the emitter terminal of a discharge transistor 342, which is a PNP bipolar transistor in the illustrated embodiment. The collector of the discharge transistor is connected to the ground reference 146.

The anode of a base clamping diode 344 is connected to the base of the discharge transistor 342. The cathode of the base clamping diode is connected to the emitter of the discharge transistor. The base clamping diode prevents the voltage on the base of the discharge transistor from exceeding the voltage on the emitter of the discharge transistor by more than one forward diode drop.

The anode of a base diode 346 is also connected to the base of the discharge transistor 342. The cathode of the base diode is connected to a first terminal of a voltage sensing capacitor 350 and to the first terminal of a bleeder resistor 352. The commonly connected cathode and first terminals are connected to the input terminal 322 of the voltage drop sensing circuit 320 are thus connected to the $V_{SENSE}$ node 310. The respective second terminals of the voltage sensing capacitor and the bleeder resistor are connected to the ground reference.

The voltage drop sensing circuit 320 does not affect the operation of the LED driver circuit 300 when the AC power is initially applied and while the LED driver circuit continues to operate with the AC power connected. When AC power is initially applied to the LED driver circuit, the voltage on the $V_{BRIDGE}$ bus 144 is applied to the voltage sensing node 310 via the power input resistor 280. Accordingly, the voltage is applied to the respective first terminals of the bleeder resistor 352 and the voltage sensing capacitor 350 via the input 332 of the voltage drop sensing circuit. The resistance of the bleeder resistor is substantially greater than the resistance of the power input resistor. Thus, substantially all of the $V_{BRIDGE}$ voltage is applied across the voltage sensing capacitor as the $V_{SENSE}$ voltage. The capacitance of the voltage sensing capacitor is relatively small compared to the capacitance of the $V_{CC}$ filter capacitor 270. Thus, the voltage sensing capacitor charges very quickly while the $V_{CC}$ filter capacitor charges slowly on initial power up such that the voltage on the voltage sensing capacitor is initially greater than the voltage on the $V_{CC}$ filter capacitor. The higher voltage on the voltage sensing capacitor prevents the emitter-base junction of the discharge transistor 342 from being forward biased. Thus, the discharge transistor remains off during initial power on of the LED driver circuit.

After the LED driver circuit 300 is powered up, the voltage sensing capacitor 350 remains charged to the $V_{SENSE}$ voltage determined by the voltage divider formed by the power input resistor 280 and the bleeder resistor 352. The voltage is slightly less than the $V_{BRIDGE}$ voltage. The $V_{CC}$ filter capacitor 270 is charged to a voltage less than the $V_{RAIL}$ voltage, which is less than the $V_{BRIDGE}$ voltage. Accordingly, the emitter-base junction of the discharge transistor 342 remains reverse biased during normal operation.

Figure 4:
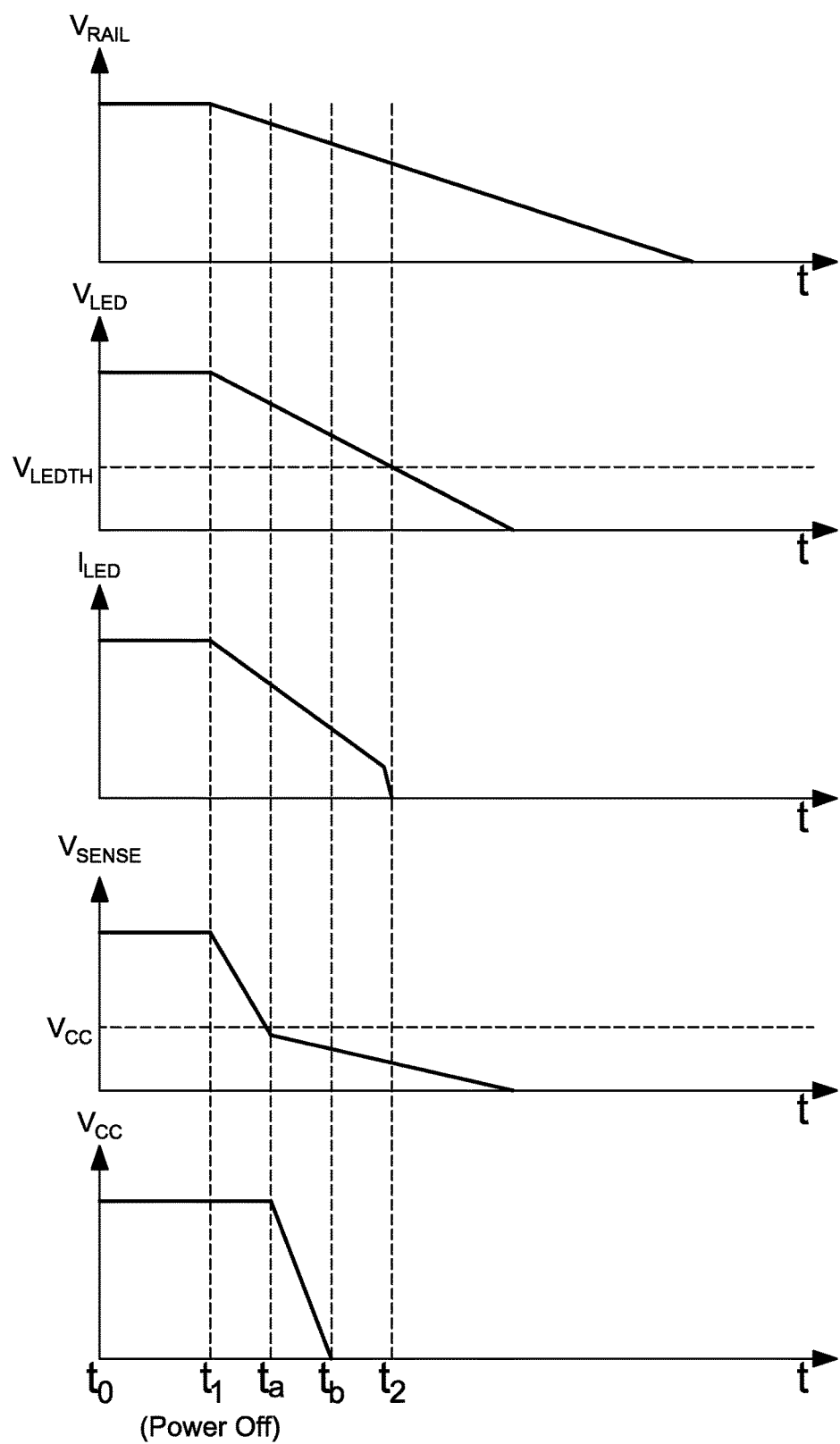
FIG. 4 illustrates waveforms of the rail voltage $V_{RAIL}$, the LED load voltage $V_{LED}$, the LED load current $I_{LED}$, the sensed voltage $V_{SENSE}$, and the $V_{CC}$ voltage in the LED drive circuit of FIG. 3.

When the AC source 110 is disabled or is no longer connected to the inputs 122, 124 of the LED driver circuit 300, the voltage drop sensing circuit 320 operates to prevent the LED driver circuit from causing the LED flash described above. The operation of the voltage drop sensing circuit is illustrated by waveforms in FIG. 4. An upper waveform in FIG. 4 represents a timing diagram illustrating the reduction in a rail voltage $V_{RAIL}$ after the AC source to the LED drive circuit of FIG. 3 is disconnected. A second waveform in FIG. 4 represents a voltage $V_{LED}$ across the LED load connected to the LED drive circuit of FIG. 3. A third waveform in FIG. 4 represents a current $I_{LED}$ through the LED load connected to the LED drive circuit of FIG. 3. A fourth waveform in FIG. 4 represents the $V_{SENSE}$ voltage across the voltage sensing capacitor 350 and thus represents the voltage on the voltage sensing node 310. A fifth waveform in FIG. 4 represents the voltage on the $V_{CC}$ node 272 corresponding to the voltage across the $V_{CC}$ filter capacitor 270.

The five waveforms in FIG. 4 represent the normal operation of the LED driver circuit 300 from a time $t_0$ to a time $t_1$ when the AC power from the AC source 110 continues to be applied to the inputs 122, 124 of the full-wave bridge rectifier 120. At the time t1, the AC power is disconnected or otherwise disabled such that the $V_{RAIL}$ voltage begins to decrease as the $V_{RAIL}$ filter capacitor 168 discharges. The decreasing $V_{RAIL}$ voltage causes corresponding decreases in the $V_{LED}$ voltage and the $I_{LED}$ current. As further shown in FIG. 4, the $V_{CC}$ voltage on the $V_{CC}$ node 272 initially remains substantially constant because the charge pump 260 continues to provide charging current to the $V_{CC}$ filter capacitor 270 as the controller 180 continues to operate despite the decreasing $V_{RAIL}$ voltage.

If the $V_{CC}$ voltage across the $V_{CC}$ filter capacitor 270 were allowed to remain at the initial level as the $V_{RAIL}$ voltage decreases, the controller 180 would continue to switch the two switching elements 182, 184, and the LED flash would occur as before; however, in the embodiment of FIG. 3, the voltage drop sensing circuit 320 prevents the LED flash. When the AC source 110 is disconnected or otherwise disabled, the $V_{BRIDGE}$ voltage on the $V_{BRIDGE}$ voltage bus 144 decreases rapidly and no longer provides current through the power input resistor 280 to maintain the charge across the voltage sensing capacitor 350. The voltage sensing capacitor begins to discharge through the bleeder resistor 352, the power input resistor 280 and the bridge load resistor 150. The capacitance of the voltage sensing capacitor is much less than the capacitance of the $V_{CC}$ filter capacitor. Thus, the discharge rate of the voltage sensing capacitor is much greater than the discharge rate of the $V_{CC}$ filter capacitor as illustrated by the steep decrease in the $V_{SENSE}$ voltage in FIG. 4 between the time $t_1$ and a time $t_a$. As discussed above, the decreasing straight line actually represents a first portion of an exponential discharge.

At the time $t_a$, the $V_{SENSE}$ voltage on the voltage sensing capacitor 350 drops below the $V_{CC}$ voltage (e.g., by the total of a forward emitter-base drop and a forward diode drop) such that the discharge transistor 342 starts conducting and the emitter of the discharge transistor is pulled down to a voltage near the zero volts on the ground reference 146. The $V_{SENSE}$ voltage on the voltage sensing capacitor continues to exponentially discharge through the bleeder resistor 352, the power input resistor 280 and the bridge load resistor 150 as represented by a second straight line segment.

When the discharge transistor conducts, the $V_{CC}$ filter capacitor 270 is discharged rapidly through the discharge resistor 340 as illustrated by a steep discharge portion of the $V_{CC}$ waveform in FIG. 4 between the time $t_a$ and a time $t_b$. When the $V_{CC}$ filter capacitor discharges below the operating voltage threshold of the controller 180, the controller will no longer switch the two switching elements 182, 184 to produce an AC voltage on the common node 186. Thus, the power tank circuit 190 no longer provides a DC voltage to maintain the charge on the load capacitor 240. The $V_{LED}$ voltage on the load capacitor will continue to decrease as the voltage is discharged through the LED load 172.

When the $V_{LED}$ voltage on the load capacitor 240 reaches the threshold voltage for the series-connected LEDs in the LED load 172 at a time $t_2$, the LEDs will discontinue conducting, which causes the $I_{LED}$ current to quickly drop to zero. Although the load on the output of the power tank circuit 190 is reduced, the reduction in the load does not cause the voltage across the load capacitor to temporarily increase because the controller and the two switching elements are no longer operating drive to produce an AC voltage at the input to the power tank circuit. Accordingly, the charge pump circuit 260 is not able to replenish the charge on the load capacitor. As a result the $V_{LED}$ voltage continues to slowly discharge without producing a voltage spike to cause the LED flash described above.

As described above, the LED drive voltage ($V_{LED}$) drifts downward as the $V_{RAIL}$ filter capacitor 168 and the load capacitor 250 discharge in the embodiment of FIG. 3. The capacitance of the voltage sensing capacitor 350 and the resistance of the bleeder resistor 352 are selected such that the discharge transistor 342 is turned on well before the $V_{LED}$ voltage decreases to the threshold voltage of the LED load 172. The $V_{CC}$ filter capacitor 270 is discharged rapidly via the discharge resistor 340 such that the controller 180 is disabled while the $V_{LED}$ voltage is still above the threshold voltage of the LED load. Thus, when the $V_{LED}$ voltage reaches the threshold voltage and the LEDs in the LED load turn off, the disabled controller cannot cause switching of the two switching elements 182, 184 to increase the $V_{LED}$ voltage regardless of the voltage remaining on the $V_{RAIL}$ filter capacitor.

Figure 5:
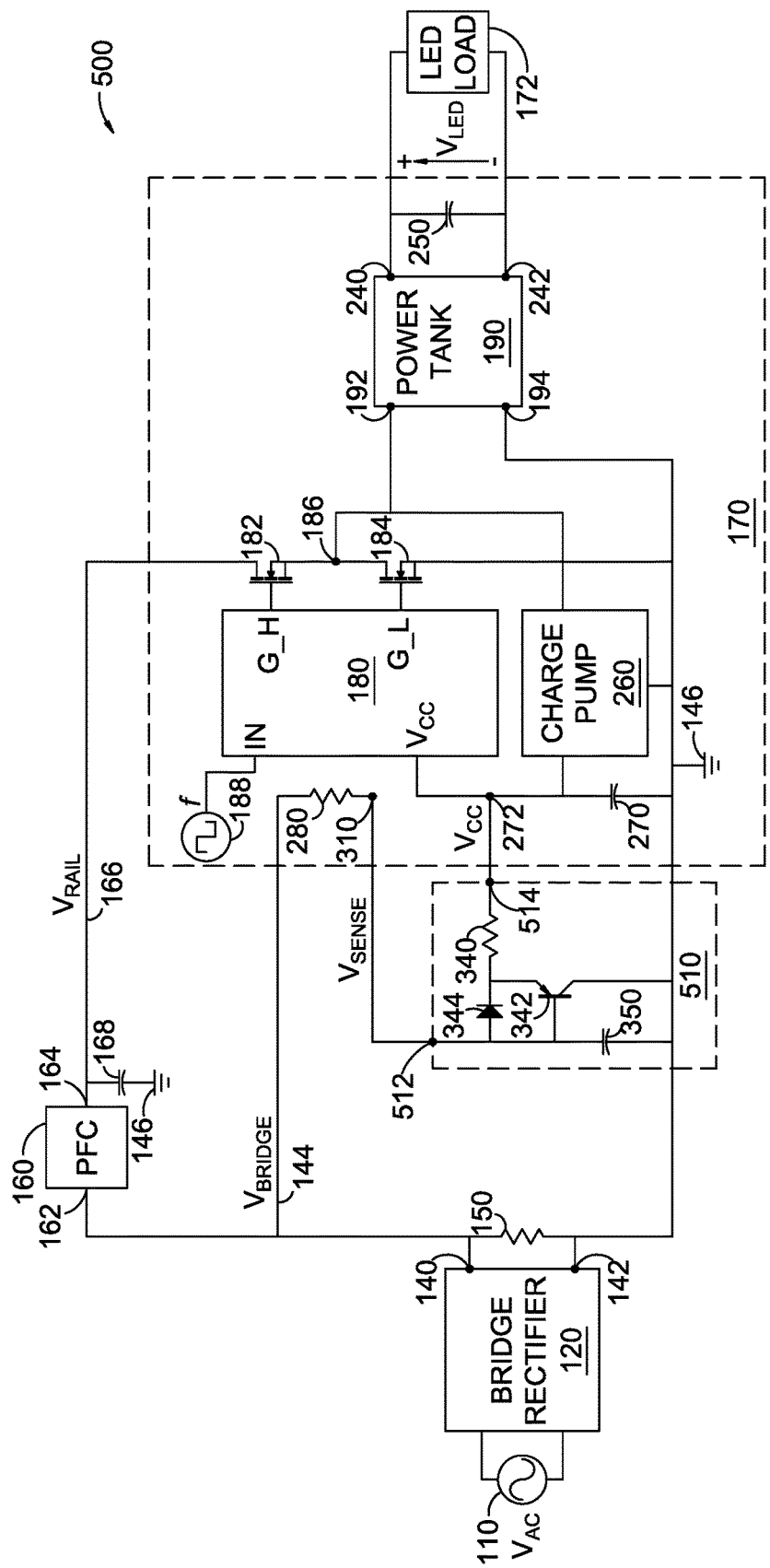
FIG. 5 illustrates a circuit diagram showing an LED drive circuit similar to the LED drive circuit of FIG. 3 but with a modified voltage drop sensing circuit.

FIG. 5 illustrates a second embodiment of an LED drive circuit 500, which is similar to the LED drive circuit 300 of FIG. 3. The LED drive circuit of FIG. 5 includes a modified voltage drop sensing circuit 510 having fewer components than the voltage drop sensing circuit 320 of FIG. 3. The LED drive circuit of FIG. 5 also has fewer components providing power to the controller 180. Other than as described below, the elements in FIG. 5 correspond to the elements in FIG. 3 and are numbered accordingly.

The voltage drop sensing circuit 510 includes an input terminal 512 and an output terminal 514. The output terminal is connected to the $V_{CC}$ node 272 and thus is connected to the first terminal of the $V_{CC}$ filter capacitor 270 as previously described. The input terminal of the voltage drop sensing circuit of FIG. 5 is connected directly to the second terminal of the power input resistor 280 via the $V_{SENSE}$ node 310 as in FIG. 3.

The LED drive circuit 500 does not include the Zener diode 312 and the isolation diode 314 shown in FIG. 3 to provide power to the $V_{CC}$ node 272 from the power input resistor 280. Rather, power from the power input resistor is provided to the $V_{CC}$ node via the base clamping diode 344 and the discharge resistor 340 in the voltage drop sensing circuit. Thus, the passive voltage source in FIG. 5 comprises the power input resistor, the base clamping diode and the discharge resistor.

The discharge resistor 340 in the voltage drop sensing circuit 510 of FIG. 5 has the first terminal connected to the output terminal 514 and has the second terminal connected to the emitter of the discharge transistor 342 as previously described. The collector of the discharge transistor is connected to the ground reference 146. Unlike the discharge transistor in the previously described embodiment, the base of the discharge transistor in FIG. 5 is connected directly to the input terminal 512 and to the first terminal of the voltage sensing capacitor 350. The second terminal of the voltage sensing capacitor is connected to the ground reference. The bleeder resistor 352 (FIG. 3) is not included in the embodiment of FIG. 5 to reduce parts count and to reduce power dissipation.

In the voltage drop sensing circuit 510 of FIG. 5, the base clamping diode 344 has the anode connected to the base of the discharge transistor 342 and has the cathode connected to the emitter of the discharge transistor as in the embodiment of FIG. 3. The anode of the base clamping diode in FIG. 5 is connected directly to the input terminal 512 of the voltage drop sensing circuit.

In the embodiment of FIG. 5, the base clamping diode 344 is in the supply path to the $V_{CC}$ filter capacitor 270 when the LED drive circuit 500 is initially powered on. Current flows from the $V_{BRIDGE}$ bus 144 through the power input resistor 280 to the $V_{SENSE}$ node 310. Current is conducted from the $V_{SENSE}$ node through the base clamping diode and through the discharge resistor 340 to the $V_{CC}$ node 272 to charge the $V_{CC}$ filter capacitor 270. The $V_{CC}$ filter capacitor is charged via the charging path until the voltage on the $V_{CC}$ node reaches the threshold voltage for operation of the controller 180. After the controller starts to operate to switch the two switching elements 182, 184, power is provided to the $V_{CC}$ node via the charge pump circuit 260 to maintain the charge on the $V_{CC}$ filter capacitor as described above.

The voltage drop sensing circuit 510 of FIG. 5 operates in a similar manner to the previously described voltage drop sensing circuit 310 of FIG. 3. The voltage sensing capacitor 350 remains charged while the $V_{BRIDGE}$ voltage on the $V_{BRIDGE}$ bus 144 is maintained at a high voltage level by the rectified output of the full-wave bridge rectifier 120. When the AC source 110 is disconnected or otherwise disabled, the $V_{BRIDGE}$ voltage drops rapidly as described above. The $V_{SENSE}$ voltage on the $V_{SENSE}$ node 310 is initially maintained by the voltage sensing capacitor 350; however, the voltage sensing capacitor begins to discharge via the power input resistor 280 and the bridge load resistor 150. The base clamping diode 344 is reverse-biased, which precludes the $V_{CC}$ node 272 from providing current to maintain the charge on the voltage sensing capacitor. Accordingly, the voltage on the base of the discharge transistor 244 drops to cause the emitter-base junction of the discharge transistor to become forward biased. The discharge transistor conducts to start discharging the $V_{CC}$ filter capacitor 270 via the discharge resistor 340. Thus, the voltage on the $V_{CC}$ node drops rapidly while the voltage on the $V_{RAIL}$ bus 166 remains at a relatively higher voltage and decreases at a slower rate.

When the voltage on the $V_{CC}$ node 272 drops below the operational threshold voltage of the controller 180, the controller ceases operation and no longer switches the two switching elements 182, 184 to produce the AC voltage on the common node 186. The power tank circuit 190 ceases operation, and the $V_{LED}$ voltage on the rectifier output node 236 continues to drop as the load capacitor 240 discharges through the LED load 172. Since the controller remains off, the $V_{LED}$ voltage does not spike when the LEDs within the LED load no longer conduct.

The previous detailed description has been provided for the purposes of illustration and description. Thus, although there have been described particular embodiments of the present invention of a new and useful "Circuit and Method for Eliminating Power-Off Flash for LED Drivers," it is not intended that such references be construed as limitations upon the scope of this invention except as set forth in the following claims.

What is claimed is:

1. A drive circuit for providing a DC voltage to a plurality of light-emitting diodes (LEDs), comprising:
   a rectifier configured to convert an applied AC voltage to a rectified DC voltage;
   a passive voltage circuit configured to receive the rectified DC voltage and produce a first charging voltage;
   a power factor correction circuit having an input configured to receive the rectified DC voltage and having an output configured to provide a rail DC voltage;
   a switching DC-DC converter configured to receive the rail DC voltage and convert the rail DC voltage to an LED drive voltage and to a second charging voltage, the DC-DC converter including a controller, at least first and second semiconductor switches, and a resonant tank circuit, the semiconductor switches selectively switched by the controller to produce a switched DC voltage, the resonant tank circuit responsive to the switched DC voltage to produce the LED drive voltage, the controller having a power input terminal, the controller operable to switch the semiconductor switches only when a voltage on the power input terminal is at least as great as a controller threshold voltage;
   a filter capacitor coupled to provide a controller supply voltage to the power input terminal of the controller, the filter capacitor configured to receive the first charging voltage when the applied AC voltage is initially applied to the rectifier, the first charging voltage charging the capacitor to the controller threshold voltage, the capacitor receiving the second charging voltage when the controller is operable after the capacitor charges to the controller threshold voltage; and
   a voltage drop sensing circuit coupled to receive the first charging voltage, the voltage drop sensing circuit configured to sense when the first charging voltage decreases upon loss of the applied AC voltage, the voltage drop sensing circuit responsive to the decreasing first charging voltage to discharge the filter capacitor below the controller threshold voltage to halt the operation of the controller and thereby cease producing the LED drive voltage.

2. The circuit of claim 1, wherein the passive voltage circuit comprises a power input resistor.

3. The circuit of claim 2, wherein the power input resistor in the passive voltage circuit includes a first terminal and a second terminal, the first terminal connected to the rectifier, the second terminal coupled to the filter capacitor and coupled to the voltage drop sensing circuit.

4. The circuit of claim 2, wherein:
   the power input resistor in the passive voltage circuit includes a first terminal and a second terminal, the first terminal connected to the rectifier, the second terminal connected to the voltage drop sensing circuit; and
   the passive voltage circuit further includes a Zener diode and a forward-biased diode connected in series between the second terminal of the power input resistor and the filter capacitor.

5. The circuit of claim 2, wherein:
   the power input resistor in the passive voltage circuit includes a first terminal and a second terminal, the first terminal connected to the rectifier, the second terminal further connected to the voltage drop sensing circuit; and
   the passive voltage circuit further includes a forward-biased diode and resistor connected in series between the second terminal of the power input resistor and the filter capacitor.

6. The circuit of claim 1, wherein the voltage drop sensing circuit comprises a discharge resistor and a discharge transistor, the discharge resistor and the discharge transistor connected in series across the filter capacitor, the discharge transistor responsive to the decreasing first charging voltage to turn on the discharge transistor and to discharge the filter capacitor via the discharge resistor.

7. The circuit of claim 1, wherein the voltage drop sensing circuit further comprises a voltage sensing capacitor connected to the control terminal of the discharge transistor, the voltage sensing capacitor having a capacitance less than the capacitance of the filter capacitor, the voltage sensing capacitor discharging faster than the filter capacitor upon loss of the applied AC voltage to turn on the discharge transistor and increase the discharge rate of the filter capacitor.

8. The circuit of claim 1, further including a capacitor coupled to the output of the power factor correction circuit, the capacitor configured to maintain the DC rail voltage on the output of the power factor correction circuit at a slowly decreasing level for a selected time after the loss of the applied AC voltage to enable the DC-DC converter to continue generating the LED drive voltage, the LED drive voltage decreasing in response to the decreasing level of the DC rail voltage, the voltage drop sensing circuit operable to halt the operation of the controller before the LED drive voltage decreases to a threshold voltage for operating the plurality of LEDs.

9. A drive circuit for providing a DC voltage to a plurality of light-emitting diodes (LEDs) in response to an applied input voltage, comprising:
- a first charging voltage circuit responsive to the applied input voltage to generate a first charging voltage;
- a rail voltage circuit responsive to the applied input voltage to generate a rail voltage;
- a switching DC-DC converter responsive to the rail DC voltage to generate an LED drive voltage and a second charging voltage, the DC-DC converter including a controller having a power input terminal, the DC-DC converter operable only when a voltage on the power input terminal of the controller is at least as great as a controller threshold voltage;
- a filter capacitor coupled to provide a controller supply voltage to the power input terminal of the controller, the filter capacitor receiving the first charging voltage when the applied input voltage is active, the first charging voltage charging the filter capacitor to the controller threshold voltage, the filter capacitor receiving the second charging voltage when the controller is operable after the filter capacitor charges to the controller threshold voltage; and
- a voltage drop sensing circuit coupled to receive the first charging voltage, the voltage drop sensing circuit sensing when the first charging voltage decreases upon loss of the applied input voltage, the voltage drop sensing circuit responsive to the decreasing first charging voltage to discharge the filter capacitor below the controller threshold voltage to halt the operation of the controller and thereby cease producing the LED drive voltage.

10. The circuit of claim 9, further including a capacitor connected to the rail voltage circuit, the capacitor maintaining the DC rail voltage at a slowly decreasing level for a selected time after the loss of the applied input voltage to enable the DC-DC converter to continue generating the LED drive voltage, the LED drive voltage decreasing in response to the decreasing level of the DC rail voltage, the voltage drop sensing circuit operable to halt the operation of the DC-DC converter before the LED drive voltage decreases to a threshold voltage for operating the plurality of LEDs.

11. A method for preventing power-off flash in a light-emitting diode (LED) drive circuit, comprising:
- generating a switched DC voltage from an applied input voltage with a switching DC-DC converter, the switching DC-DC converter controlled by a switching controller having a power input terminal;
- generating an LED drive voltage from the switched DC voltage
- generating a first capacitor charging voltage responsive to the applied input voltage;
- generating a second capacitor charging voltage responsive to the switched DC voltage;
- applying the first capacitor charging voltage and the second capacitor charging voltage to a controller power input capacitor to charge the controller power input capacitor and provide a DC supply voltage to the switching controller; and
- sensing a loss of the applied input voltage and discharging the controller input capacitor to disable the switching controller before the LED drive voltage decreases to a voltage level below an operational threshold voltage of the plurality of LEDs.

* * * * *